United States Patent
Erdman et al.

(10) Patent No.: US 7,567,743 B1
(45) Date of Patent: Jul. 28, 2009

(54) FIELD TERMINATING METHOD AND DEVICE

(75) Inventors: David Donald Erdman, Gynnekstiwb, PA (US); Michael Lawrence Gurreri, York, PA (US); Sean Patrick Kelly, York, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/061,132

(22) Filed: Apr. 2, 2008

(51) Int. Cl.
*G02B 6/255* (2006.01)
*G02B 6/00* (2006.01)

(52) U.S. Cl. .................. 385/134; 385/136; 385/139; 385/147

(58) Field of Classification Search .................. None
See application file for complete search history.

(56) References Cited

U.S. PATENT DOCUMENTS

| | | | |
|---|---|---|---|
| 4,688,707 A * | 8/1987 | Szostak et al. ............. 225/2 |
| 5,123,581 A | 6/1992 | Curtis | |
| 5,312,468 A | 5/1994 | Yin | |
| 5,501,385 A * | 3/1996 | Halpin ...................... 225/96 |
| 5,838,850 A | 11/1998 | Mansfield | |
| 6,578,747 B2 | 6/2003 | Murgatroyd | |
| 2007/0196054 A1* | 8/2007 | Palmer et al. ............. 385/75 |

FOREIGN PATENT DOCUMENTS

WO   WO 98/54608   12/1998
WO   WO 2007/034205 A2   3/2007

* cited by examiner

*Primary Examiner*—Michelle R Connelly Cushwa

(57) ABSTRACT

A method of terminating a fiber in a connector, the method comprising: (a) securing a stripped fiber to a device; (b) while the fiber is secured to the device, cleaving the fiber to produce a cleaved fiber; (c) securing a connector having a stub to the device; (d) while the connector and the fiber are secured to the device, inserting the cleaved fiber into the connector such that the cleaved fiber mates with the stub; (e) and securing the fiber to the connector.

20 Claims, 4 Drawing Sheets

FIELD TERMINATING METHOD AND DEVICE

FIELD OF INVENTION

The present invention relates generally to field-installable connectors, and, more specifically, to a device and method for field terminating fibers in a convenient and predictable way.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to optically couple a fiber with a mating device (e.g., another fiber, an active device or a passive device). This is achieved by holding the end of the fiber such that the core of the fiber is axially aligned with the optical pathway of the mating device.

To facilitate an effective optical coupling, the end face of the ferrule is typically polished. Furthermore, a family of special connectors have ferrules that are polished at an angle to reduce return loss, which is the ratio of input power to reflected power. These connectors are referred to as angled physical contact (APC) connectors. By polishing the ferrule at an angle, light that is reflected at the face of the ferrule is reflected at an angle into the cladding of the fiber, rather than back down the fiber core where it can interfere and diminish forward-propagating optical signals. An APC angle is usually about 7 to 12 degrees.

Preparing a polished ferrule is a sophisticated process. It requires cleaving the fibers, terminating them in a ferrule, and polishing the ferrule to exacting tolerances. Therefore, such a process is usually performed in a controlled setting with precision equipment by skilled personnel. Frequently, however, connectors must be terminated in the field where such facilities and personnel are not available. Under these conditions, it is desirable to omit the step of the polishing the ferrule by instead terminating the fiber in a connector which has a fiber stub already terminated in a polished ferrule. Because the ferrule is already polished in a fiber-stub, field-installable connector, field installation requires only optically coupling the fiber to the fiber stub. This is often done with using a refractive index matched gel to improve optical coupling therebetween.

Although field-installable connectors eliminate the need to polishing the ferrule in the field, terminating the fiber to the connector can nevertheless be difficult in the field, where conditions often require the installer to perform this operation without a workbench and using handheld tools. Indeed, the operation is often performed while standing.

Furthermore, the task is even more difficult for an APC connector in which the fiber stub is angle cleaved, requiring the terminating fiber to be angle-cleaved too. The angle-cleaved terminating fiber should be rotationally aligned with the stub to optically couple properly. If there is even slight rotational misalignment (e.g., 15 degrees), the angled end faces of the stub and terminating fiber will interfere and create a longitudinal gap between the two fibers. These gaps tend to significantly increase insertion losses in certain situations. Therefore, to properly terminate an APC fiber in the field, it must be cleaved at the same angle as the stub and rotationally aligned with the stub. However, keeping the fiber oriented with the connector is complicated by the fact that the angle of the cleave cannot be perceived by the naked eye. Consequently, rotational misalignment of the fiber is often discovered only after the fiber is terminated due to poor optical performance. Discovering problems at this stage requires that the fiber be re-terminated, which wastes not only time, but also the connector if the field-installable connector design can only be terminated to a fiber once.

Therefore, an approach is needed for simplifying field terminations, especially APC-type connector terminations, which ensures that the fiber is cleaved precisely and rotationally aligned with the connector. The present invention fulfills this need among others.

SUMMARY OF INVENTION

The present invention provides a system and method for terminating fibers in the field conveniently and precisely. Applicants recognize that field termination is simplified significantly if the fiber is held steady relative to the connector before and after it is cleaved. This is particularly the case for APC connectors where rotational alignment of the fiber and fiber stub is critical. To this end, the present invention involves securing both the fiber and the connector to a common substrate. This approach not only simplifies field termination, but also ensures rotational alignment between the fiber and the connector. Furthermore, this approach enables the user to splice and terminate a connector using a single device.

One aspect of the present invention is a device having a common substrate for cleaving and terminating a fiber in connector. In one embodiment, the device comprises: (a) a substrate; (b) a fiber retainer attached to the substrate; (c) a connector retainer attached to the substrate; and (d) a cleaver attached to the substrate. In a preferred embodiment, the device also comprises a waste bin to store fiber waste. This way, the entire operation of cleaving and terminating a fiber is performed using a common platform.

Another aspect of the present invention is a method for cleaving and terminating a fiber by holding the cleaved fiber and connector and cleaving the fiber using a common platform. In one embodiment, the method comprises: (a) securing a stripped fiber to a device; (b) while the fiber is secured to the device, cleaving the fiber to produce a cleaved fiber; (c) securing a connector having a stub to the device; (d) while the connector and the fiber are secured to the device, inserting the cleaved fiber into the connector such that the cleaved fiber mates with the stub; (e) and securing the fiber to the connector.

DETAILED DESCRIPTION

Figure 1:
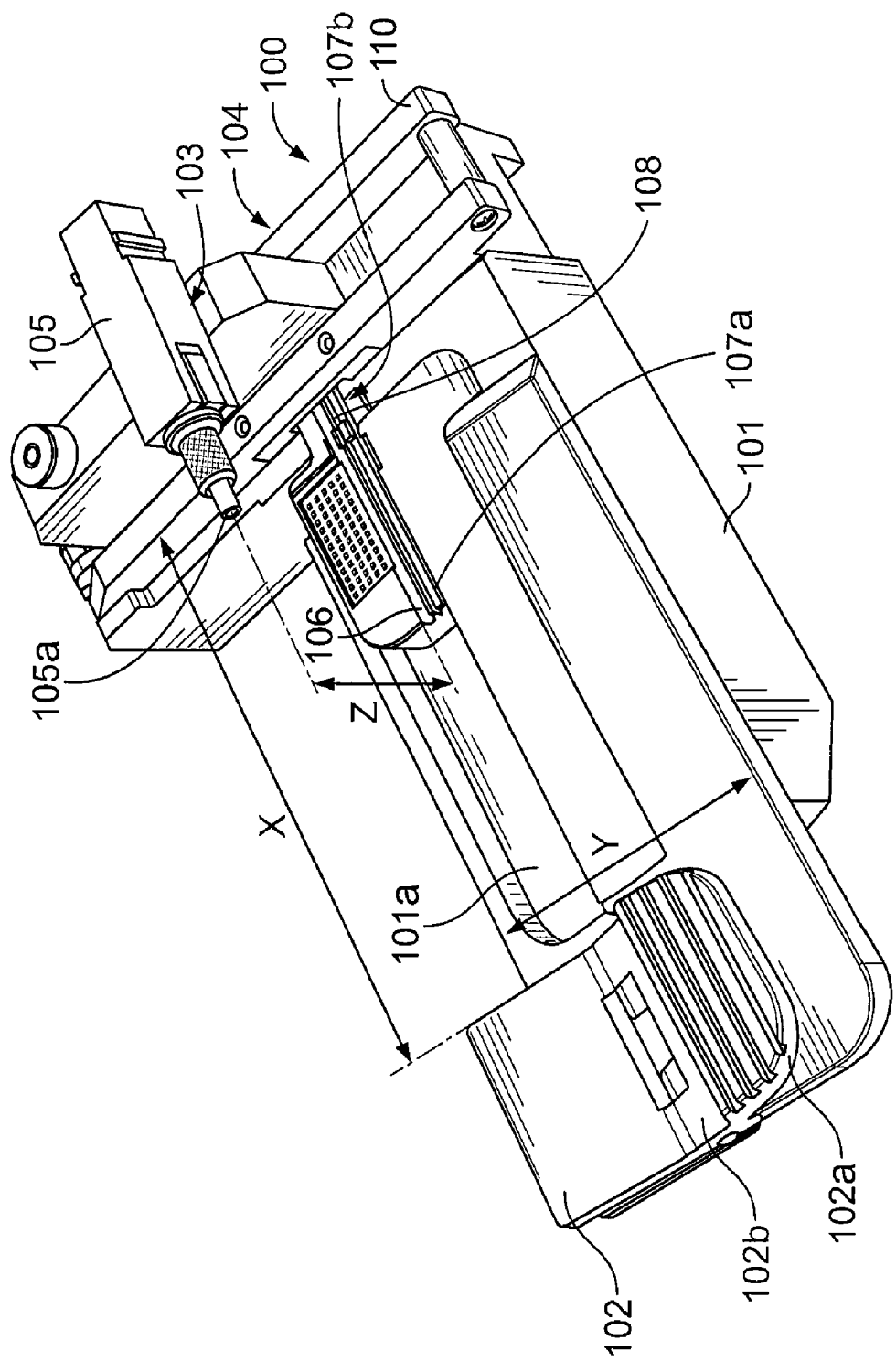
FIG. 1 shows a device of the present invention with a connector secured to it.

Referring to FIG. 1, a preferred embodiment of the device 100 of the present invention is shown. The device comprises a substrate 101 defining x, y, and z axes as shown. Specifically, the y axis is across the width of the device, the x axis is along its length, and the z axis is normal to the device. A fiber retainer 102 is attached to the substrate at one end, and a connector retainer 103 is attached essentially at the other end. The connector retainer 102 is positioned relative to the substrate such that a fiber secured in the fiber retainer and inserted in the connector is essentially in an xz plane as defined by the x and z axes. A cleaver 104 is also attached to the substrate and is positioned on the substrate such that a fiber secured to the fiber retainer and inserted into the cleaver is also in the xz plane. The features of this device are considered in detail below.

The substrate 101 functions to hold the fiber retainer, connector retainer, and cleaver in relative position to each other. Although the position of the components may vary on the substrate 101, preferably, but not necessarily, they are arranged such that, when a fiber is secured by the fiber retainer 102 and is either in the cleaver 104 or in a connector 105 (secured by the connector retainer 103), it lies essentially in the same plane (the xz plane). The term "essentially" is used in this context to indicate that the fiber need not be in the exact same plane (indeed, because the fiber is a three dimensions object, it cannot be in a single plane). Rather, a fiber is considered to be essentially in the same plane if its offset along the y axis results in negligible rotational misalignment at the connector 105. Negligible rotational misalignment is defined herein as anything less than about 5 degrees.

The substrate may be in any form suitable for holding the fiber retainer, connector retainer and cleaver in relative position to each other. For example, the substrate may be a planar platform, or it may comprise rails or elongated members defining a framework for supporting the various components. In the embodiment shown in FIG. 1, the substrate 101 is essentially a planar platform.

In one embodiment, the substrate also defines a surface 101a on which the fiber rests during cleaving. This surface may also comprise alignment features to precisely position the fiber in the cleaver 104. For example, in the embodiment of FIG. 1, the surface 101a defines a groove 106 for receiving the fiber during the cleaving step (described below). Groove 106 is configured with a wide section 107a and a narrow section 107b. The wide section is configured to receive the buffered fiber, while the narrow section is configured to receive the bare fiber. Between the two sections is a stop 108 against which the buffer of the fiber abuts when the fiber is pushed toward the cleaver 104 from the fiber retainer 102. Because the stop 108 is a precise distance from the cleaver 104, the length of bare fiber extending beyond the buffer is controlled with precision.

The fiber retainer 102 functions to grip the buffer around the fiber and prevent the fiber from sliding axially or rotating. The term "fiber retainer" is used broadly in this context and refers to a mechanism for holding something. Suitable fiber retainers includes, for example, clamps, clips, wedges, set screws, vices or any other device suitable for securing a buffered fiber. As shown I FIG. 1. the retainer 102 is a clamp having a bottom portion 102a and a top portion 102b, which is pivotally mounted and biased closed.

The fiber retainer 102 is attached to the substrate. The term "attached" as used in this context refers to either directly or indirectly attached. For example, the fiber retainer may be secured directly to the substrate as in the embodiment of FIG. 1. In fact, in this embodiment, the bottom portion 102a is integral with the substrate 101 and the top portion 102b is pivotally attached to the substrate. By incorporating the bottom portion 102a into the substrate, the fiber is secured essentially in the same plane (xy plane) as surface 101a. Alternatively, the fiber clamp may be attached to the substrate via intermediate components.

The connector retainer 103 functions to hold the connector 105 in a particular position relative to the substrate (and hence the other components attached to the substrate). If the connector is an APC-type connector, it is important to hold the connector in a particular position because the connector contains an angle-cleaved fiber stub (not shown). Because the stub is angle cleaved, the position of the connector is critical to effect a good optical coupling. That is, if the connector is rotationally misaligned, the angle cleave of the stub will interfere with the terminating fiber, camming it away and thus creating an axial gap and, hence, insertion loss. Consequently, the connector retainer 103 must hold the connector secure to ensure the correct orientation of the angle cleave relative to the substrate.

The connector retainer 103 may be any mechanism capable of holding a connector. Suitable retainers include, for example, clamps, clips, wedges, set screws, vices, straps, hook and loop connectors and even adhesive means, such as tape. The connector retainer 103 used in the embodiment of FIG. 1 is tape.

Figure 2:
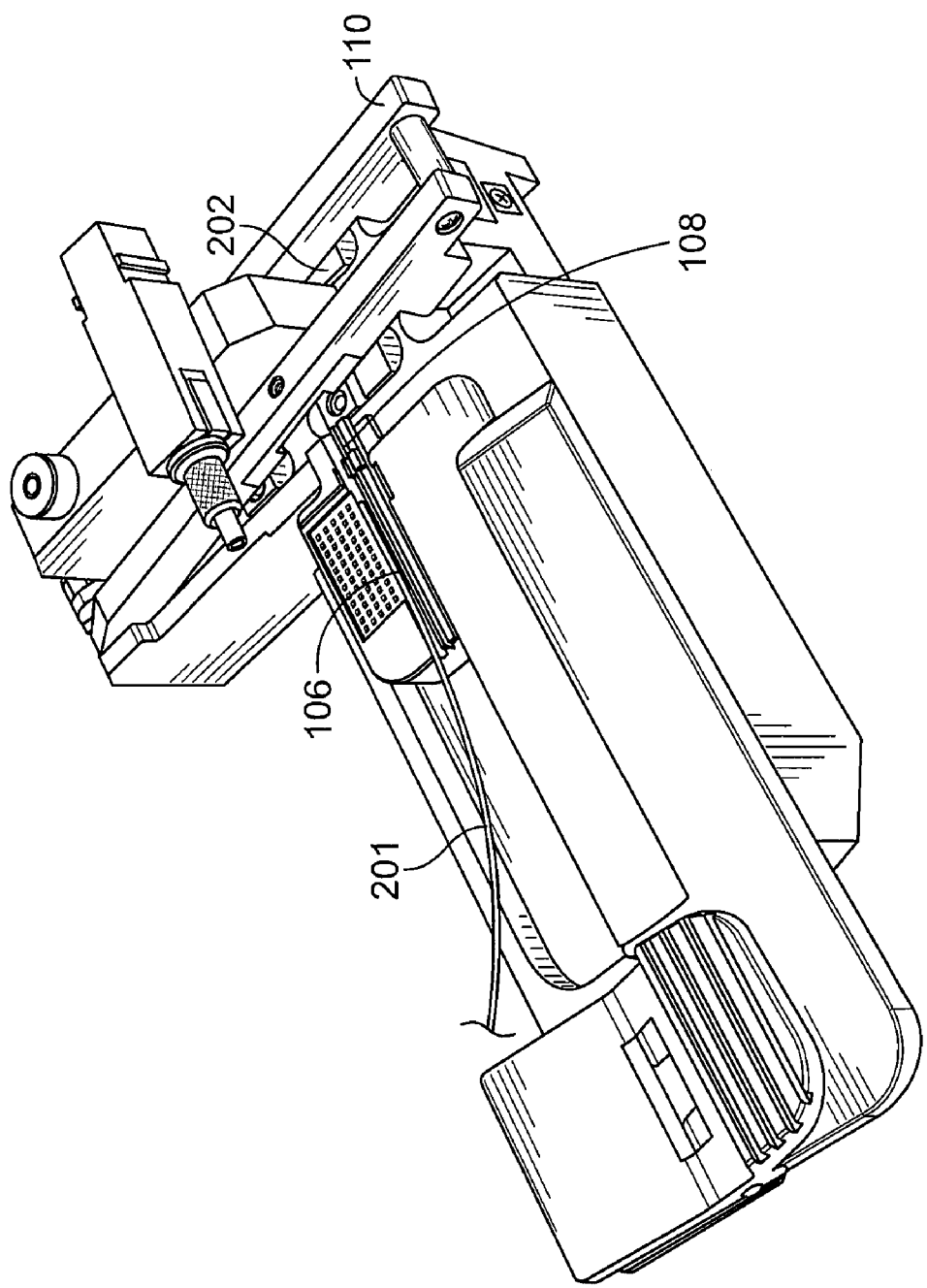
FIG. 2 shows the device of FIG. 1 with a fiber positioned in it.

The connector retainer 103 is also attached to the substrate and held in relative position to the fiber retainer. Like the fiber retainer, the connector retainer may be attached to the substrate either directly or indirectly. In the embodiment shown in FIG. 1, the connector retainer 103 is attached indirectly to the substrate. Specifically, the connector retainer 103 is atop a pivoting anvil arm 110. The connector retainer 103 in this embodiment is therefore, not only indirectly connected to the substrate, but also moveable with respect to the substrate. Although the connector retainer may be movable with respect to the substrate, it must be configured such that, in at least one position, its relative position with respect to the substrate is fixed. For example, in the embodiment of FIG. 1, although the connector retainer moves when the anvil arm 110 moves, when the anvil arm is down, the connector retainer holds the connector in a precise and repeatable position vis-à-vis the substrate. To enhance the repeatability and precision of the connector's positioning, the anvil arm is secured in place with magnets 202 (FIG. 2).

The cleaver 104 functions to cleave the fiber at an angle in a precise and predictable way. Such angle cleavers are known and include, for example, anvil cleavers and guillotines. In the embodiment shown in FIG. 1, an anvil cleaver is used. Specifically, the anvil (not shown) is disposed on the anvil arm 110. When the arm is pushed downward, the anvil pushes the bare fiber downward causing it to bend as it contacts a diamond edge (not shown). The diamond edge creates a flaw while the fiber is bent, thereby propagating an angled cleave.

Device 100 facilitates a method of terminating any field installable connector and is particularly well suited for field terminating APC connectors by providing a common substrate for fixing and preferably aligning the cleaving and termination operations. More specifically, referring FIGS. 1-4, the steps of the method of the present invention are described in detail with respect to an APC connector termination, although the present invention can be practiced with non-APC connectors as well.

Referring to FIG. 1, an APC, fiber-stub, field-installable connector 105 is secured to device 100 by the connector retainer 103. The position of the connector 105 is critical. Specifically, the connector is secured such that the angle of the stub is in said certain orientation relative to substrate. Furthermore, it must be properly aligned with the cleaver 104 to minimize rotational misalignment between the angled fiber stub it contains and the terminating fiber when the fiber is removed from the cleaver 104 and inserted in the connector (described below). Although securing the connector 105 to the device 100 is herein described as the first step, it need not be done until after the fiber is cleaved as described below.

Referring to FIG. 2, the fiber 201 is positioned relative to the cleaver 104 as shown. Specifically, the anvil arm 110 is raised to allow the bare fiber access to the cleaver 104, and the fiber 201 is pushed forward in the groove 106 until the buffered portion of the fiber abuts the buffer stop 108. In this position, the bare fiber protrudes s from the buffered fiber into the cleaver 104.

Figure 3:
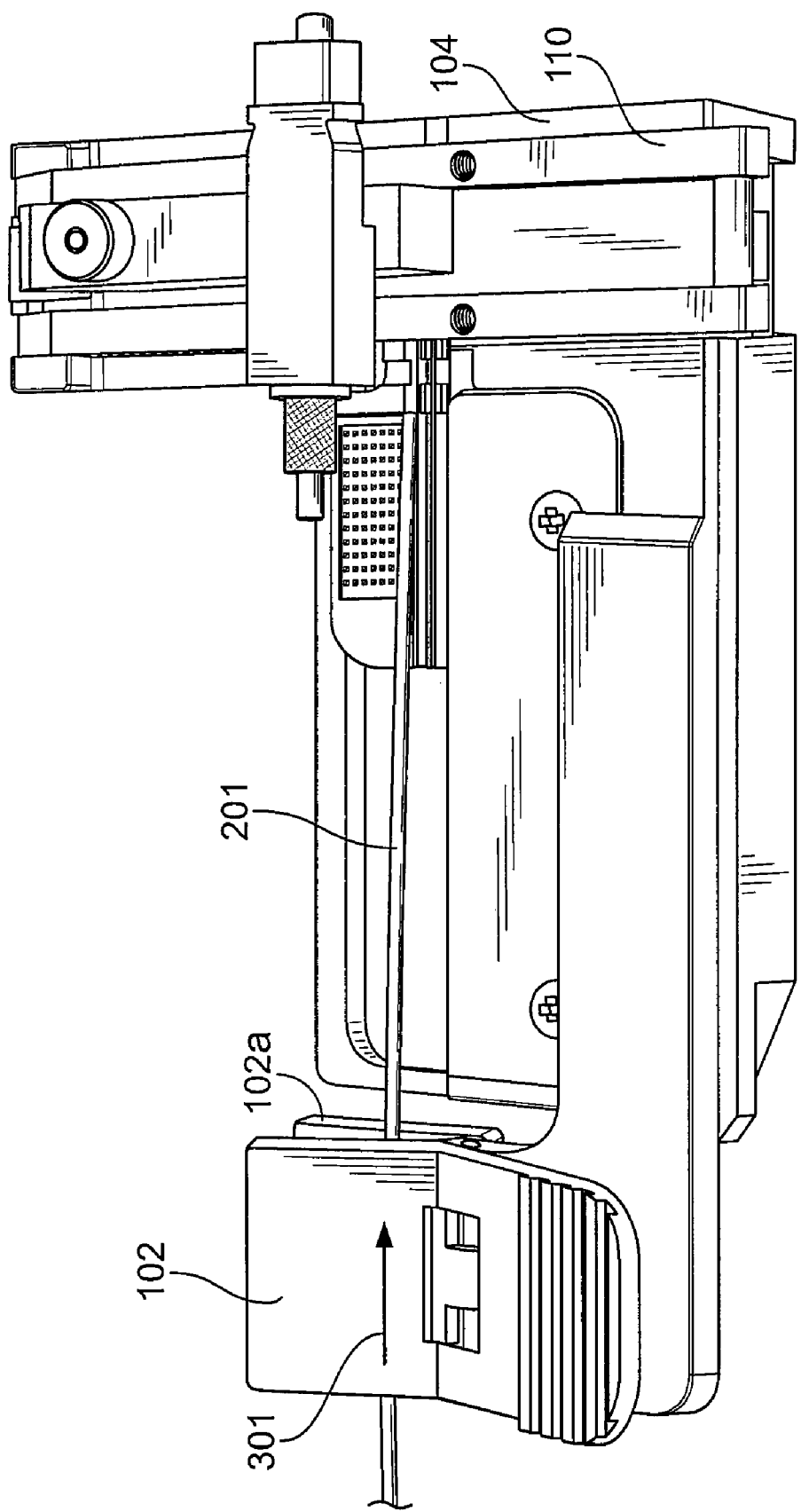
FIG. 3 shows the device of FIG. 1 with the fiber secured to the device.

Referring to FIG. 3, after the fiber is positioned in groove 106 and the bare fiber extends into the cleaver 104, the cable is secured using fiber retainer 102. It is important that the fiber be straight at this point. In other words, there should be no bends in the fiber 201 from the cleaver 104 to the fiber retainer 102. To this end, it may be preferable to use alignment marks 301 on the fiber retainer to ensure proper alignment with the cleaver. It is also preferable for the retainer to be in the same by plane as the cleaver 104. To this end, the lower portion 102a of the fiber retainer is integrated with the substrate as mentioned above.

Once the fiber is in positioned and secured by the fiber retainer 102, the cleaver 104 is actuated by pushing the anvil arm 110 down toward the substrate. As described above, pushing the arm down causes the anvil to urge against the fiber 201, bending and forcing it into a diamond edge. The diamond edge creates a flaw while it is bent resulting in an angled cleaved fiber. It is important that the cleaver be configured to cleave the fiber to produce an angle-cleaved fiber with the angle in the same certain orientation relative to the substrate as that of the fiber stub described above.

The bare fiber remnant can be discarded at this point. In one embodiment, a bin (not shown) is located adjacent the cleaver to "catch" the bare fiber remnant once it is cleaved. By containing the cleaved remnants, the nescience and injury risk they present is avoided.

Figure 4:
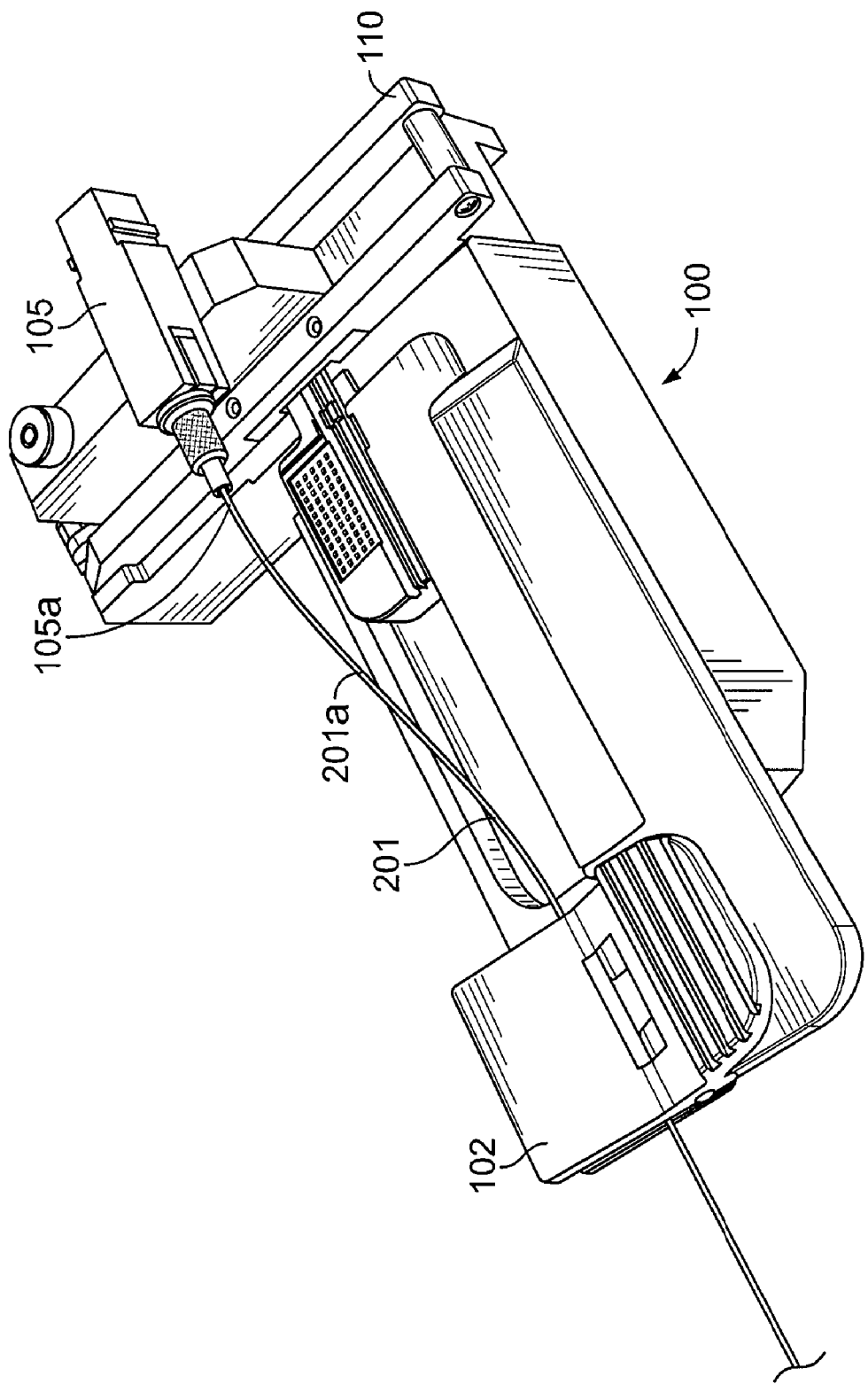
FIG. 4 shows the device of FIG. 1 with a cleaved fiber inserted into a connector attached to the device.

Referring to FIG. 4, once the fiber is cleaved, the anvil arm 110 is lifted and the angle-cleaved fiber is removed. The anvil arm 110 is then returned to its normal (down) position and, while the fiber remains secured to the device by fiber retainer 102, the cleaved fiber 201 is inserted in the end 105a of connector 105 until the angle cleaved end contacts the angle cleave of the fiber stub within the connector 105a. It is desirable that a bend or buckle 201a be present in the fiber 201 to create a forward bias and thereby ensure proper pressure at the optical coupling of the angled cleave end and the fiber stub. Such a bend or buckle 201a is formed preferably by positioning the connector 105 such that it is closer to the fiber retainer 102 than the cleaver 103 is. This way, the fiber must be bent to be inserted into the connector 105.

Once the cleaved fiber is inserted into connector 105, the connector 105 is actuated to secure the fiber to the connector. Specifically, the fiber is held in intimate contact with the fiber stub by virtue of a clamping mechanism in the connector, which applies a radial force to the terminating fiber to secure it to the connector. Advantageously, this clamping mechanism facilitates straightforward field assembly by obviating the need to handle epoxy and for curing ovens during field termination. Tyco Electronics (Harrisburg, Pa.) offers a family of field-installable connectors that are axially-actuated (see, for example, US Application No. 20070127873, which is hereby incorporated by reference). These field-installable connectors are available, for example, as SC and LC type connectors.

Termination of a fiber in a field-installable connector is typically performed using a tool resembling a pair of pliers. Accordingly, the connector retainer 103 should be configured to hold the connector sufficient away from the substrate to allow the pliers access to the connector.

It should be understood that the description above provides illustrative embodiments of the present invention and other embodiments exist.

What is claimed is:

1. A method of terminating a fiber in a connector, said method comprising: securing a stripped fiber to a device;
   while said fiber is secured to said device, cleaving said fiber to produce a cleaved fiber;
   securing a connector having a stub to said device;
   while said connector and said fiber are secured to said device, inserting said cleaved fiber into said connector such that said cleaved fiber mates with said stub; and
   securing said fiber to said connector.

2. The method of claim 1, wherein cleaving comprises angle cleaving said fiber to form a cleaved end face having a certain orientation relative to said device, and wherein said connector is secured such that a corresponding end face of said stub is in said certain orientation relative to said device.

3. The method of claim 2, wherein said device has x, y and z axes, and comprises a substrate, a connector retainer attached to said substrate for securing said connector, a fiber retainer attached to said substrate for securing said fiber, and a cleaver attached to said substrate for angle cleaving said fiber.

4. The method of claim 3, wherein said fiber is in a common xz plane when it is secured in said fiber retainer and is inserted either in said connector or in said cleaver.

5. The method of claim 3, wherein said fiber is bent in said xz plane after being inserted into said connector.

6. The method of claim 3, wherein said connector is secured in a position offset along the z axis from said cleaver.

7. The method of claim 1, wherein securing said fiber to said device comprises disposing a buffered portion of said fiber in an alignment groove such that said buffered portion abuts a buffer stop to align said stripped portion in said cleaver.

8. The method of claim 7, wherein securing said fiber comprises straighten said fiber between said fiber retainer and said buffer stop before securing said fiber to said device.

9. The method of claim 1, wherein said connector is secured prior to said fiber being cleaved.

10. A device for field termination of angle-cleaved fiber, said device comprising:
    a substrate having a top and bottom orientation;
    a fiber retainer attached to said substrate;
    a cleaver attached to said substrate; and
    a connector retainer operatively attached to said substrate and disposed above said cleaver.

11. The device of claim 10, wherein said substrate defines x, y, and z axes, wherein said z axis is a vertical axis, wherein said connector retainer is positioned relative to said substrate such that a fiber secured in said fiber retainer and inserted in said connector is essentially in a vertical, xz plane, and wherein said cleaver is positioned on said substrate such that a fiber secured to said fiber retainer and inserted into said cleaver is essentially in the same vertical xz plane.

12. The device of claim 11, wherein said connector retainer is offset from said cleaver along said z axis.

13. The device of claim 11, wherein said connector retainer is positioned and configured to hold a connector having a fiber with an angled end face such that the angle end face is closer to the fiber retainer than said clever is to said fiber retainer.

14. The device of claim 10, wherein said cleaver is an anvil type cleaving mechanism.

15. The device of claim 10, wherein said substrate comprises a groove between said fiber retainer and said cleaver.

16. The device of claim 15, wherein said fiber retainer and said groove are essentially on a common xy plane.

17. The device of claim 10, further comprising a bin adjacent said cleaver to store fiber cutoffs after cleaving.

18. The device of claim 10, wherein said cleaver is an anvil type cleaver in which an anvil is mounted on a pivoting arm, which, when pushed toward said substrate bears down on a fiber in a groove to bend said fiber and force it into a cleaving edge.

19. The device of claim 18, wherein said connector retainer is attached to said pivoting arm.

20. The device of claim 10, further comprising a connector held by said connector retainer, wherein the distance between said fiber retainer and said cleaver is longer than the distance from said fiber retainer to said connector held by said connector retainer, such that, when a fiber is cleaved in said cleaver and then the cleaved fiber is removed from the cleaver and inserted into said connector, said cleaved fiber bends.

* * * * *

UNITED STATES PATENT AND TRADEMARK OFFICE
CERTIFICATE OF CORRECTION

| | | |
|---|---|---|
| PATENT NO. | : 7,567,743 B1 | Page 1 of 1 |
| APPLICATION NO. | : 12/061132 | |
| DATED | : July 28, 2009 | |
| INVENTOR(S) | : David Donald Erdman, Michael Lawrence Gurreri and Sean Patrick Kelly | |

It is certified that error appears in the above-identified patent and that said Letters Patent is hereby corrected as shown below:

Title Page, INID Code (75) Inventors, line 1, change "Gynnekstiwb" to "Hummelstown"

Signed and Sealed this

Twenty-second Day of September, 2009

David J. Kappos
*Director of the United States Patent and Trademark Office*